US009220202B2

(12) United States Patent
Maxik et al.

(10) Patent No.: US 9,220,202 B2
(45) Date of Patent: Dec. 29, 2015

(54) LIGHTING SYSTEM TO CONTROL THE CIRCADIAN RHYTHM OF AGRICULTURAL PRODUCTS AND ASSOCIATED METHODS

(71) Applicant: BIOLOGICAL ILLUMINATION, LLC, Satellite Beach, FL (US)

(72) Inventors: Fredric S. Maxik, Cocoa Beach, FL (US); Robert R. Soler, Cocoa Beach, FL (US); David E. Bartine, Cocoa, FL (US); Eliza Katar Grove, Satellite Beach, FL (US); Neil Yorio, Indian Harbour Beach, FL (US); Anthony Crawford, Palm Bay, FL (US)

(73) Assignee: Biological Illumination, LLC, Melbourne, FL (US)

( * ) Notice: Subject to any disclaimer, the term of this patent is extended or adjusted under 35 U.S.C. 154(b) by 0 days.

(21) Appl. No.: 14/487,489

(22) Filed: Sep. 16, 2014

(65) Prior Publication Data
US 2015/0084524 A1    Mar. 26, 2015

Related U.S. Application Data (63) Continuation-in-part of application No. 13/681,522, filed on Nov. 20, 2012, and a continuation-in-part of
(Continued)

(51) Int. Cl.
*A01G 9/20* (2006.01)
*A01G 7/04* (2006.01)
(Continued)

(52) U.S. Cl.
CPC ............ *A01G 7/045* (2013.01); *H05B 33/0863* (2013.01); *H05B 33/0869* (2013.01); *H05B 37/0281* (2013.01)

(58) Field of Classification Search
CPC ........... A01G 1/00; A01G 1/001; A01G 9/20; A01G 7/04; A01G 7/045; A01G 7/06

USPC ....................................................... 47/58.1 LS
See application file for complete search history.

(56) References Cited

U.S. PATENT DOCUMENTS

| 5,046,494 A | 9/1991 | Searfoss et al. |
| 5,221,877 A | 6/1993 | Falk |

(Continued)

FOREIGN PATENT DOCUMENTS

| CN | 101 702 421 A | 5/2010 |
| EP | 0851260 | 7/1998 |

(Continued)

OTHER PUBLICATIONS

Arthur P. Fraas, Heat Exchanger Design, 1989, p. 60, John Wiley & Sons, Inc., Canada.

(Continued)

*Primary Examiner* — Monica Williams
(74) *Attorney, Agent, or Firm* — Mark Malek; Daniel Pierron; Widerman Malek, PL (57) ABSTRACT

A lighting system comprising a light source, a controller operably coupled to the light source, and a timekeeping device operably coupled to the controller. The controller is configured to receive a selected action time associated with an agricultural product. The agricultural product includes an associated circadian rhythm defining an optimal action time range. The controller is configured to determine a lighting schedule responsive to the selected action time, the optimal action time range, and a time of day indicated by the timekeeping device, the lighting schedule being configured to impose a circadian rhythm on the agricultural product to shift the optimal action time range such that the selected action time coincides with the optimal action time range. The controller is configured to operate the light source according to the lighting schedule.

21 Claims, 7 Drawing Sheets

Related U.S. Application Data application No. 14/315,660, filed on Jun. 26, 2014, now Pat. No. 9,024,536, which is a continuation-in-part of application No. 14/165,198, filed on Jan. 27, 2014, now Pat. No. 8,941,329, which is a continuation of application No. 13/311,300, filed on Dec. 5, 2011, now Pat. No. 8,686,641.

(60) Provisional application No. 61/948,185, filed on Mar. 5, 2014.

(51) Int. Cl.
    H05B 37/02 (2006.01)
    H05B 33/08 (2006.01)

(56) References Cited

U.S. PATENT DOCUMENTS

| | | | |
|---|---|---|---|
| 5,523,878 A | 6/1996 | Wallace et al. | |
| 5,680,230 A | 10/1997 | Kaburagi et al. | |
| 5,704,701 A | 1/1998 | Kavanagh et al. | |
| 5,813,753 A | 9/1998 | Vriens et al. | |
| 5,997,150 A | 12/1999 | Anderson | |
| 6,027,225 A | 2/2000 | Martin et al. | |
| 6,140,646 A | 10/2000 | Busta et al. | |
| 6,259,572 B1 | 7/2001 | Meyer, Jr. | |
| 6,290,382 B1 | 9/2001 | Bourn et al. | |
| 6,341,876 B1 | 1/2002 | Moss et al. | |
| 6,356,700 B1 | 3/2002 | Strobl | |
| 6,369,517 B2 | 4/2002 | Song et al. | |
| 6,370,168 B1 | 4/2002 | Spinelli | |
| 6,459,919 B1 * | 10/2002 | Lys et al. | 600/407 |
| 6,528,954 B1 | 3/2003 | Lys et al. | |
| 6,542,671 B1 | 4/2003 | Ma et al. | |
| 6,554,439 B1 * | 4/2003 | Teicher et al. | 362/2 |
| 6,561,656 B1 | 5/2003 | Kojima et al. | |
| 6,577,080 B2 | 6/2003 | Lys et al. | |
| 6,586,882 B1 | 7/2003 | Harbers | |
| 6,594,090 B2 | 7/2003 | Kruschwitz et al. | |
| 6,641,283 B1 | 11/2003 | Bohler | |
| 6,733,135 B2 | 5/2004 | Dho | |
| 6,734,639 B2 | 5/2004 | Chang et al. | |
| 6,762,562 B2 | 7/2004 | Leong | |
| 6,767,111 B1 | 7/2004 | Lai | |
| 6,787,999 B2 | 9/2004 | Stimac et al. | |
| 6,817,735 B2 | 11/2004 | Shimizu et al. | |
| 6,870,523 B1 | 3/2005 | Ben-David et al. | |
| 6,871,982 B2 | 3/2005 | Holman et al. | |
| 6,893,140 B2 | 5/2005 | Storey et al. | |
| 6,940,101 B2 | 9/2005 | Yano et al. | |
| 6,945,672 B2 | 9/2005 | Du et al. | |
| 6,967,761 B2 | 11/2005 | Starkweather et al. | |
| 6,974,713 B2 | 12/2005 | Patel et al. | |
| 7,008,559 B2 | 3/2006 | Chen | |
| 7,015,636 B2 | 3/2006 | Bolta | |
| 7,034,934 B2 | 4/2006 | Manning | |
| 7,042,623 B1 | 5/2006 | Huibers et al. | |
| 7,058,197 B1 | 6/2006 | McGuire et al. | |
| 7,070,281 B2 | 7/2006 | Kato | |
| 7,072,096 B2 | 7/2006 | Holman et al. | |
| 7,075,707 B1 | 7/2006 | Rapaport et al. | |
| 7,083,304 B2 | 8/2006 | Rhoads | |
| 7,095,053 B2 | 8/2006 | Mazzochette et al. | |
| 7,144,131 B2 | 12/2006 | Rains | |
| 7,157,745 B2 | 1/2007 | Blonder et al. | |
| 7,178,941 B2 | 2/2007 | Roberge et al. | |
| 7,184,201 B2 | 2/2007 | Duncan | |
| 7,187,484 B2 | 3/2007 | Mehrl | |
| 7,213,926 B2 | 5/2007 | May et al. | |
| 7,234,844 B2 | 6/2007 | Bolta et al. | |
| 7,246,923 B2 | 7/2007 | Conner | |
| 7,247,874 B2 | 7/2007 | Bode et al. | |
| 7,252,408 B2 | 8/2007 | Mazzochette et al. | |
| 7,255,469 B2 | 8/2007 | Wheatley et al. | |
| 7,261,453 B2 | 8/2007 | Morejon et al. | |
| 7,289,090 B2 | 10/2007 | Morgan | |
| 7,300,177 B2 | 11/2007 | Conner | |
| 7,303,291 B2 | 12/2007 | Ikeda et al. | |
| 7,306,352 B2 | 12/2007 | Sokolov et al. | |
| 7,319,293 B2 | 1/2008 | Maxik | |
| 7,324,076 B2 | 1/2008 | Lee et al. | |
| 7,325,956 B2 | 2/2008 | Morejon et al. | |
| 7,342,658 B2 | 3/2008 | Kowarz et al. | |
| 7,344,279 B2 | 3/2008 | Mueller et al. | |
| 7,344,280 B2 | 3/2008 | Panagotacos et al. | |
| 7,349,095 B2 | 3/2008 | Kurosaki | |
| 7,353,859 B2 | 4/2008 | Stevanovic et al. | |
| 7,369,056 B2 | 5/2008 | McCollough et al. | |
| 7,382,091 B2 | 6/2008 | Chen | |
| 7,382,632 B2 | 6/2008 | Alo et al. | |
| 7,400,439 B2 | 7/2008 | Holman | |
| 7,427,146 B2 | 9/2008 | Conner | |
| 7,429,983 B2 | 9/2008 | Islam | |
| 7,434,946 B2 | 10/2008 | Huibers | |
| 7,436,996 B2 | 10/2008 | Ben-Chorin | |
| 7,438,443 B2 | 10/2008 | Tatsuno et al. | |
| 7,476,016 B2 | 1/2009 | Kurihara | |
| 7,479,861 B2 | 1/2009 | Zepke et al. | |
| 7,497,596 B2 | 3/2009 | Ge | |
| 7,520,607 B2 | 4/2009 | Casper et al. | |
| 7,520,642 B2 | 4/2009 | Holman et al. | |
| 7,521,875 B2 | 4/2009 | Maxik | |
| 7,528,421 B2 | 5/2009 | Mazzochette | |
| 7,530,708 B2 | 5/2009 | Park | |
| 7,537,347 B2 | 5/2009 | Dewald | |
| 7,540,616 B2 | 6/2009 | Conner | |
| 7,556,376 B2 | 7/2009 | Ishak et al. | |
| 7,556,406 B2 | 7/2009 | Petroski et al. | |
| 7,573,210 B2 * | 8/2009 | Ashdown et al. | 315/307 |
| 7,598,686 B2 | 10/2009 | Lys et al. | |
| 7,598,961 B2 | 10/2009 | Higgins | |
| 7,605,971 B2 | 10/2009 | Ishii et al. | |
| 7,619,372 B2 | 11/2009 | Garrity | |
| 7,626,755 B2 | 12/2009 | Furuya et al. | |
| 7,633,093 B2 | 12/2009 | Blonder et al. | |
| 7,633,779 B2 | 12/2009 | Garrity et al. | |
| 7,637,643 B2 | 12/2009 | Maxik | |
| 7,670,021 B2 | 3/2010 | Chou | |
| 7,677,736 B2 | 3/2010 | Kazasumi et al. | |
| 7,678,140 B2 | 3/2010 | Brainard et al. | |
| 7,679,281 B2 | 3/2010 | Kim et al. | |
| 7,684,007 B2 | 3/2010 | Hull et al. | |
| 7,703,943 B2 | 4/2010 | Li et al. | |
| 7,705,810 B2 | 4/2010 | Choi et al. | |
| 7,708,452 B2 | 5/2010 | Maxik et al. | |
| 7,709,811 B2 | 5/2010 | Conner | |
| 7,719,766 B2 | 5/2010 | Grasser et al. | |
| 7,728,846 B2 | 6/2010 | Higgins et al. | |
| 7,732,825 B2 | 6/2010 | Kim et al. | |
| 7,748,845 B2 | 7/2010 | Casper et al. | |
| 7,748,877 B1 | 7/2010 | Colby | |
| 7,766,490 B2 | 8/2010 | Harbers et al. | |
| 7,806,575 B2 | 10/2010 | Willwohl et al. | |
| 7,819,556 B2 | 10/2010 | Heffington et al. | |
| 7,824,075 B2 | 11/2010 | Maxik et al. | |
| 7,828,453 B2 | 11/2010 | Tran et al. | |
| 7,828,465 B2 | 11/2010 | Roberge et al. | |
| 7,832,878 B2 | 11/2010 | Brukilacchio et al. | |
| 7,834,867 B2 | 11/2010 | Sprague et al. | |
| 7,835,056 B2 | 11/2010 | Doucet et al. | |
| 7,841,714 B2 | 11/2010 | Gruber | |
| 7,845,823 B2 | 12/2010 | Mueller et al. | |
| 7,855,376 B2 | 12/2010 | Cantin et al. | |
| 7,871,839 B2 | 1/2011 | Lee | |
| 7,880,400 B2 | 2/2011 | Zhoo et al. | |
| 7,889,430 B2 | 2/2011 | El-Ghoroury et al. | |
| 7,905,637 B2 | 3/2011 | Caluori et al. | |
| 7,906,722 B2 | 3/2011 | Fork et al. | |
| 7,906,789 B2 | 3/2011 | Jung et al. | |
| 7,922,356 B2 | 4/2011 | Maxik et al. | |
| 7,928,565 B2 | 4/2011 | Brunschwiler et al. | |
| 7,964,883 B2 | 6/2011 | Mazzochette et al. | |
| 7,972,030 B2 | 7/2011 | Li | |
| 7,976,182 B2 | 7/2011 | Ribarich | |

(56) References Cited

U.S. PATENT DOCUMENTS

| | | |
|---|---|---|
| 7,976,205 B2 | 7/2011 | Grotsch et al. |
| 7,984,989 B2 | 7/2011 | Gruber |
| 8,016,443 B2 | 9/2011 | Falicoff et al. |
| 8,038,314 B2 | 10/2011 | Ladewig |
| 8,040,070 B2 | 10/2011 | Myers et al. |
| 8,047,660 B2 | 11/2011 | Penn et al. |
| 8,049,763 B2 | 11/2011 | Kwak et al. |
| 8,061,857 B2 | 11/2011 | Liu et al. |
| 8,070,302 B2 | 12/2011 | Hatanaka et al. |
| 8,076,680 B2 | 12/2011 | Lee et al. |
| 8,083,364 B2 | 12/2011 | Allen |
| 8,096,668 B2 | 1/2012 | Abu-Ageel |
| 8,115,419 B2 | 2/2012 | Given et al. |
| 8,164,844 B2 | 4/2012 | Toda et al. |
| 8,172,436 B2 | 5/2012 | Coleman et al. |
| 8,182,106 B2 | 5/2012 | Shin et al. |
| 8,182,115 B2 | 5/2012 | Takahashi et al. |
| 8,188,687 B2 | 5/2012 | Lee et al. |
| 8,192,047 B2 | 6/2012 | Bailey et al. |
| 8,201,968 B2 | 6/2012 | Maxik et al. |
| 8,207,676 B2 | 6/2012 | Hilgers |
| 8,212,836 B2 | 7/2012 | Matsumoto et al. |
| 8,227,813 B2 | 7/2012 | Ward |
| 8,253,336 B2 | 8/2012 | Maxik et al. |
| 8,256,921 B2 | 9/2012 | Crookham et al. |
| 8,272,763 B1 | 9/2012 | Chinnam et al. |
| 8,274,089 B2 | 9/2012 | Lee |
| 8,297,783 B2 | 10/2012 | Kim |
| 8,297,798 B1 | 10/2012 | Pittman et al. |
| 8,304,978 B2 | 11/2012 | Kim et al. |
| 8,310,171 B2 | 11/2012 | Reisenauer et al. |
| 8,319,445 B2 | 11/2012 | McKinney et al. |
| 8,324,808 B2 | 12/2012 | Maxik et al. |
| 8,324,823 B2 | 12/2012 | Choi et al. |
| 8,324,840 B2 | 12/2012 | Shteynberg et al. |
| 8,331,099 B2 | 12/2012 | Geissler et al. |
| 8,337,029 B2 | 12/2012 | Li |
| 8,348,492 B2 | 1/2013 | Mier-Langner et al. |
| 8,378,574 B2 | 2/2013 | Schlangen et al. |
| 8,384,984 B2 | 2/2013 | Maxik et al. |
| 8,401,231 B2 | 3/2013 | Maxik et al. |
| 8,405,299 B2 | 3/2013 | Toda et al. |
| 8,410,717 B2 | 4/2013 | Shteynberg et al. |
| 8,410,725 B2 | 4/2013 | Jacobs et al. |
| 8,427,590 B2 | 4/2013 | Raring et al. |
| 8,441,210 B2 | 5/2013 | Shteynberg et al. |
| 8,446,095 B2 | 5/2013 | Maxik et al. |
| 8,454,197 B2 | 6/2013 | Hauschulte |
| 8,465,167 B2 | 6/2013 | Maxik et al. |
| 8,531,126 B2 | 9/2013 | Kaihotsu et al. |
| 8,547,391 B2 | 10/2013 | Maxik et al. |
| 8,643,276 B2 | 2/2014 | Maxik et al. |
| 8,672,518 B2 | 3/2014 | Boomgaarden et al. |
| 8,674,613 B2 | 3/2014 | Gray et al. |
| 8,678,787 B2 | 3/2014 | Hirata et al. |
| 8,680,457 B2 | 3/2014 | Maxik et al. |
| 8,686,641 B2 | 4/2014 | Maxik et al. |
| 2002/0113555 A1 | 8/2002 | Lys et al. |
| 2002/0151941 A1 | 10/2002 | Okawa et al. |
| 2004/0052076 A1 | 3/2004 | Mueller et al. |
| 2005/0033119 A1 | 2/2005 | Okawa et al. |
| 2005/0218780 A1 | 10/2005 | Chen |
| 2005/0267213 A1 | 12/2005 | Gold et al. |
| 2006/0002108 A1 | 1/2006 | Ouderkirk et al. |
| 2006/0002110 A1 | 1/2006 | Dowling et al. |
| 2006/0164005 A1 | 7/2006 | Sun |
| 2006/0285193 A1 | 12/2006 | Kimura et al. |
| 2007/0013871 A1 | 1/2007 | Marshall et al. |
| 2007/0041167 A1 | 2/2007 | Nachi |
| 2007/0159492 A1 | 7/2007 | Lo et al. |
| 2007/0165193 A1 | 7/2007 | Kubo et al. |
| 2007/0262714 A1 | 11/2007 | Bylsma |
| 2008/0119912 A1 | 5/2008 | Hayes |
| 2008/0143973 A1 | 6/2008 | Wu |
| 2008/0170398 A1 | 7/2008 | Kim |
| 2008/0198572 A1 | 8/2008 | Medendorp |
| 2008/0232084 A1 | 9/2008 | Kon |
| 2008/0232116 A1 | 9/2008 | Kim |
| 2009/0027900 A1 | 1/2009 | Janos et al. |
| 2009/0036952 A1 | 2/2009 | Kao et al. |
| 2009/0059585 A1 | 3/2009 | Chen et al. |
| 2009/0128781 A1 | 5/2009 | Li |
| 2009/0141506 A1 | 6/2009 | Lan et al. |
| 2009/0175041 A1 | 7/2009 | Yuen et al. |
| 2009/0273931 A1 | 11/2009 | Ito et al. |
| 2009/0303694 A1 | 12/2009 | Roth et al. |
| 2010/0001652 A1 | 1/2010 | Damsleth |
| 2010/0006762 A1 | 1/2010 | Yoshida et al. |
| 2010/0051976 A1 | 3/2010 | Rooymans |
| 2010/0053959 A1 | 3/2010 | Ijzerman et al. |
| 2010/0076250 A1 | 3/2010 | Van Woudenberg et al. |
| 2010/0096993 A1 | 4/2010 | Ashdown et al. |
| 2010/0103389 A1 | 4/2010 | McVea et al. |
| 2010/0121420 A1 | 5/2010 | Fiset et al. |
| 2010/0202129 A1 | 8/2010 | Abu-Ageel |
| 2010/0244700 A1 | 9/2010 | Chong et al. |
| 2010/0244735 A1 | 9/2010 | Buelow |
| 2010/0244740 A1 | 9/2010 | Alpert et al. |
| 2010/0270942 A1 | 10/2010 | Hui et al. |
| 2010/0277084 A1 | 11/2010 | Lee et al. |
| 2010/0315320 A1 | 12/2010 | Yoshida |
| 2010/0321641 A1 | 12/2010 | Van Der Lubbe |
| 2011/0012137 A1 | 1/2011 | Lin et al. |
| 2011/0080635 A1 | 4/2011 | Takeuchi |
| 2011/0115381 A1 | 5/2011 | Carlin |
| 2011/0162109 A1* | 6/2011 | Himanen et al. ............... 800/290 |
| 2011/0205738 A1 | 8/2011 | Peifer et al. |
| 2011/0299277 A1 | 12/2011 | Ehara |
| 2011/0310446 A1 | 12/2011 | Komatsu |
| 2012/0002411 A1 | 1/2012 | Ladewig |
| 2012/0003728 A1* | 1/2012 | Lanoue et al. ............. 435/288.7 |
| 2012/0051041 A1 | 3/2012 | Edmond et al. |
| 2012/0106144 A1 | 5/2012 | Chang |
| 2012/0140440 A1 | 6/2012 | Dam et al. |
| 2012/0140461 A1 | 6/2012 | Pickard et al. |
| 2012/0188769 A1 | 7/2012 | Lau |
| 2012/0201034 A1 | 8/2012 | Li |
| 2012/0262902 A1 | 10/2012 | Pickard et al. |
| 2012/0327650 A1 | 12/2012 | Lay et al. |
| 2013/0021792 A1 | 1/2013 | Snell et al. |
| 2013/0021803 A1 | 1/2013 | Pickard et al. |
| 2013/0099696 A1 | 4/2013 | Maxik et al. |
| 2013/0120963 A1 | 5/2013 | Holland et al. |
| 2013/0223055 A1 | 8/2013 | Holland et al. |
| 2013/0255150 A1* | 10/2013 | Karpinski et al. ........ 47/58.1 LS |
| 2013/0278148 A1 | 10/2013 | Maxik et al. |
| 2013/0278172 A1 | 10/2013 | Maxik et al. |
| 2013/0293148 A1 | 11/2013 | Holland et al. |
| 2014/0015438 A1 | 1/2014 | Maxik et al. |
| 2014/0049191 A1 | 2/2014 | Maxik et al. |
| 2014/0049192 A1 | 2/2014 | Maxik et al. |
| 2014/0185281 A1* | 7/2014 | Lee et al. ..................... 362/231 |
| 2014/0259905 A1* | 9/2014 | Ovadya et al. ........... 47/58.1 LS |

FOREIGN PATENT DOCUMENTS

| | | |
|---|---|---|
| EP | 1 888 708 | 2/2008 |
| EP | 1950491 | 7/2008 |
| EP | 2 094 064 A1 | 8/2009 |
| EP | 2 199 657 | 6/2010 |
| EP | 2 242 335 | 10/2010 |
| JP | 2005534155 | 11/2005 |
| JP | 2008226567 | 9/2008 |
| WO | WO03098977 | 11/2003 |
| WO | WO2008137732 | 11/2008 |
| WO | WO2009029575 | 3/2009 |
| WO | WO2009121539 A1 | 10/2009 |
| WO | WO2012064470 | 5/2012 |

(56) References Cited

FOREIGN PATENT DOCUMENTS

| WO | WO2012135173 | 10/2012 |
|---|---|---|
| WO | WO2012158665 | 11/2012 |

OTHER PUBLICATIONS

Binnie et al. (1979) "Fluorescent Lighting and Epilepsy" Epilepsia 20(6):725-727.

Charamisinau et al. (2005) "Semiconductor laser insert with Uniform Illumination for Use in Photodynamic Therapy" Appl Opt 44(24):5055-5068.

EP International Search Report for Application No. 10174449.8; (Dec. 14, 2010).

ERBA Shedding Light on Photosensitivity, One of Epilepsy's Most Complex Conditions. Photosensitivity and Epilepsy. Epilepsy Foundation. Accessed: Aug. 28, 2009. http://www.epilepsyfoundation.org/aboutepilepsy/seizures/photosensitivity-/gerba.cfm.

Figueiro et al. (2004) "Spectral Sensitivity of the Circadian System" Proc. SPIE 5187:207.

Figueiro et al. (2008) "Retinal Mechanisms Determine the Subadditive Response to Polychromatic Light by the Human Circadian System" Neurosci Lett 438(2):242.

Gabrecht et al. (2007) "Design of a Light Delivery System for the Photodynamic Treatment of the Crohn's Disease" Proc. SPIE 6632:1-9.

H. A El-Shaikh, S. V. Garimella, "Enhancement of Air Jet Impingement Heat Transfer using Pin-Fin Heat Sinks", D IEEE Transactions on Components and Packaging Technology, Jun. 2000, vol. 23, No. 2.

Happawana et al. (2009) "Direct De-Ionized Water-Cooled Semiconductor Laser Package for Photodynamic Therapy of Esophageal Carcinoma: Design and Analysis" J Electron Pack 131(2):1-7.

Harding & Harding (1999) "Televised Material and Photosensitive Epilepsy" Epilepsia 40(Suppl. 4):65.

Jones, Eric D., Light Emitting Diodes (LEDS) for General Lumination, an Optoelectronics Industry Development Association (OIDA) Technology Roadmap, OIDA Report, Mar. 2001, published by OIDA in Washington D.C.

J. Y. San, C. H. Huang, M. H, Shu, "Impingement cooling of a confined circular air jet", In t. J. Heat Mass Transf., 1997. pp. 1355-1364, vol. 40.

Kuller & Laike (1998) "The Impact of Flicker from Fluorescent Lighting on Well-Being, Perfiormance and Physiological Arousal" Ergonomics 41(4):433-447.

Lakatos (2006) "Recent trends in the epidemiology of Inflammatory Bowel Disease: Up or Down?" World J Gastroenterol 12(38):6102.

N. T. Obot, W. J. Douglas, A S. Mujumdar, "Effect of Semi-confinement on Impingement Heat Transfer", Proc. 7th Int. Heat Transf. Conf., 1982, pp. 1355-1364. vol. 3.

Ortner & Dorta (2006) "Technology Insight: Photodynamic Therapy for Cholangiocarcinoma" Nat Clin Pract Gastroenterol Hepatol 3(8):459-467.

Rea (2010) "Circadian Light" J Circadian Rhythms 8(1):2.

Rea et al. (2010) "The Potential of Outdoor Lighting for Stimulating the Human Circadian System" Alliance for Solid-State Illumination Systems and Technologies (ASSIST), May 13, 2010, p. 1-11.

Rosco Laboratories Poster "Color Filter Technical Data Sheet: #87 Pale Yellow Green" (2001).

S. A Solovitz, L. D. Stevanovic, R. A Beaupre, "Microchannels Take Heatsinks to the Next Level", Power Electronics Technology, Nov. 2006.

Sengupta, Upal, "How to Implement A 5-W Wireless Power System", How2Power Today, pp. 1-8, (Jul. 2010).

Stevens (1987) "Electronic Power Use and Breast Cancer: A Hypothesis" Am J Epidemiol 125(4):556-561.

Tannith Cattermole, "Smart Energy Glass controls light on demand", Gizmag.com, Apr. 18, 2010 accessed Nov. 1, 2011.

Topalkara et al. (1998) "Effects of flash frequency and repetition of intermittent photic stimulation on photoparoxysmal responses" Seizure 7(13):249-253.

Veitch & McColl (1995) "Modulation of Fluorescent Light: Flicker Rate and Light Source Effects on Visual Performance and Visual Comfort" Lighting Research and Technology 27:243-256.

Wang (2005) "The Critical Role of Light in Promoting Intestinal Inflammation and Crohn's Disease" J Immunol 174 (12):8173-8182.

Wilkins et al. (1979) "Neurophysical aspects of pattern-sensitive epilepsy" Brain 102:1-25.

Wilkins et al. (1989) "Fluorescent lighting, headaches, and eyestrain" Lighting Res Technol 21(1):11-18.

Yongmann M. Chung, Kai H. Luo, "Unsteady Heat Transfer Analysis of an Impinging Jet", Journal of Heat Transfer—Transactions of the ASME, Dec. 2002, pp. 1039-1048, vol. 124, No. 6.

U.S. Patent and Trademark Office's Non-Final Office Action dated May 23, 2013 cited in related U.S. Appl. No. 13/311,300 (14 pages).

U.S. Patent and Trademark Office's Applicant-Initiated Interview Summary dated Jul. 8, 2013 cited in related U.S. Appl. No. 13/311,300 (5 pages).

U.S. Patent and Trademark Office's Final Office Action dated Aug. 29, 2013 cited in related U.S. Appl. No. 13/311,300 (10 pages).

U.S. Patent and Trademark Office's Applicant-Initiated Interview Summary dated Oct. 30, 2013 cited in related U.S. Appl. No. 13/311,300 (3 pages).

PCT International Search Report from the International Searching Authority, dated Oct. 21, 2013 cited in related PCT/US2012/067816 (5 pages).

PCT Written Opinion from the International Searching Authority, dated Oct. 21, 2013 cited in related PCT/US2012/067816 (8 pages).

* cited by examiner

LIGHTING SYSTEM TO CONTROL THE CIRCADIAN RHYTHM OF AGRICULTURAL PRODUCTS AND ASSOCIATED METHODS

RELATED APPLICATIONS

This application is a continuation-in-part and claims the benefit under 35 U.S.C. §120 of U.S. patent application Ser. No. 13/681,522 entitled Illumination and Grow Light System and Associated Methods filed Nov. 20, 2012 and U.S. patent application Ser. No. 14/315,660 entitled Tunable LED Lamp for Producing Biologically-Adjusted Light and Associated Methods filed Jun. 26, 2014, which in turn is a CIP of U.S. patent application Ser. No. 14/165,198 entitled Tunable LED Lamp for Producing Biologically-Adjusted Light filed Jan. 27, 2013, which is in turn a continuation of U.S. patent application Ser. No. 13/311,300, now U.S. Pat. No. 8,686,641 entitled Tunable LED Lamp for Producing Biologically-Adjusted Light filed Dec. 5, 2011, the contents of each of which are incorporated in their entirety herein by reference except to the extent disclosure therein is inconsistent with disclosure herein. Furthermore, this application is related to and claims the benefit under 35 U.S.C. §119(e) of U.S. Provisional Patent Application Ser. No. 61/948,185 entitled System for Dynamically Adjusting Circadian Rhythm Responsive to Scheduled Events and Associated Methods filed Mar. 5, 2014, the content of which is incorporated in its entirety herein by reference except to the extent disclosure therein is inconsistent with disclosure herein.

FIELD OF THE INVENTION

The present invention relates to systems and methods for controlling the circadian rhythm of agricultural products.

BACKGROUND

The entrainment of agricultural products to selected circadian rhythms is a nascent field. Early evidence has demonstrated that the circadian rhythms of agricultural products can be controlled pre- and post-harvest, and that the concentration of certain phytochemicals accumulate cyclically in entrained agricultural products. However, current lighting systems having lighting configurations to entrain agricultural products have not demonstrated the capability of automated determination of lighting so as to entrain agricultural products, requiring manual operation of lighting devices to accomplish entrainment. Accordingly, there is a need in the art for a system capable of automatically determining a lighting schedule and emitting light according thereto so as to control the circadian rhythm of agricultural products.

This background information is provided to reveal information believed by the applicant to be of possible relevance to the present invention. No admission is necessarily intended, nor should be construed, that any of the preceding information constitutes prior art against the present invention.

SUMMARY OF THE INVENTION

With the above in mind, embodiments of the present invention advantageously provide a lighting solution that is capable of enhancing the circadian rhythm of agricultural products. Embodiments of the present invention also advantageously allow for the control and of pre-harvest and postharvest circadian rhythm of agricultural products.

These and other features, advantages, and objectives according to embodiments of the present invention are provided by a lighting system comprising a light source, a controller operably coupled to the light source, and a timekeeping device operably coupled to the controller. The controller may be configured to receive a selected action time associated with an agricultural product. Furthermore, the agricultural product may include an associated circadian rhythm defining an optimal action time range. The controller may be configured to determine a lighting schedule responsive to the selected action time, the optimal action time range, and a time of day indicated by the timekeeping device. The lighting schedule may be configured to impose a circadian rhythm on the agricultural product to shift the optimal action time range such that the selected action time coincides with the optimal action time range. Furthermore, the controller may be configured to operate the light source according to the lighting schedule.

In some embodiments, the lighting schedule may comprise a day period and a night period. The controller may be configured to operate the light source in a day lighting configuration to emit light that causes the agricultural product to be in a day phase of the associated circadian rhythm in the day period and to operate the light source in a night lighting configuration to emit light that causes the agricultural product to be in a night phase of the associated circadian rhythm in the night period.

In some embodiments, the controller may be configured to operate the light source to emit light such that an output intensity level within the range from 380 nm to 480 nm is greater than 125% of a relative spectral power of any other peaks above 455 nm in the day configuration. Furthermore, the controller may be configured to operate the light source such that an output intensity level within the range from 380 nm to 480 nm is less than 10% of a relative spectral power of any other peaks above 485 nm in the night configuration. Additionally, the controller may be configured to operate the light source such that an output intensity level within the range from 380 nm to 480 nm is within the range from 20% to 100% of a relative spectral power of any other peaks above 485 nm in the observation configuration.

In some embodiments, the lighting system may further comprise a triggering device operably coupled to the controller and configured to indicate one of an active state and a standby state. The controller may be configured to operate the light source in an observation configuration to emit light that facilitates the observation of the agricultural product without affecting the circadian rhythm of the agricultural product responsive to the state indicated by the triggering device. Additionally, an indication of the standby state may cause the controller to operate the light source in one of the day lighting configuration and the night lighting configuration. Furthermore, an indication of the active state may cause the controller to operate the light source in the observation configuration.

In some embodiments, the optimal action time range may be associated with a chemical compound level of the agricultural product. Furthermore, the chemical compound may be selected from the group of secondary metabolites consisting of bioprotectants, terpenes, and nutraceuticals. The lighting scheduled may be configured to at least one of maximize a chemical compound level of the agricultural product at the selected action time and minimize a chemical compound level of the agricultural product at the selected action time.

In some embodiments, the controller may be configured to determine the circadian rhythm for the agricultural product. The circadian rhythm for the agricultural produce may be determined by receiving as an input an indication of the species of the agricultural product. Additionally, the lighting system may further comprise an image capture device operably connected to the controller image recognition software configured to visually identify a species of the agricultural product. The controller may be configured to operate the image capture device to capture an image of the agricultural product. Furthermore, the controller may be configured to perform an agricultural product identification operation by using the image recognition software.

Embodiments of the present invention are additionally directed to a lighting system comprising a light source and a controller operably coupled to the light source. The controller may be configured to receive as an input a selected action time associated with an agricultural product. Additionally, the agricultural product may have an associated circadian rhythm defining an optimal action time range. In instances where the controller is configured to determine a lighting schedule responsive to the selected action time and the optimal action time range, the lighting schedule may be configured to impose a circadian rhythm on the agricultural product to shift the optimal action time range such that the selected action time coincides with the optimal action time range. Furthermore, the controller may be configured to operate the light source according to the lighting schedule.

In some embodiments according to the present invention, the optimal action time range may be associated with a chemical compound level of the agricultural product. The chemical compound may be selected from the group of secondary metabolites consisting of bioprotectants, terpenes, and nutraceuticals. Furthermore, the controller may be configured to determine a phase of the circadian rhythm of the agricultural product. In such cases, the controller may be configured to determine a shifting schedule configured to shift the circadian rhythm of the agricultural product from the determined phase such that the optimal action time range corresponds with the selected action time. Additionally, the lighting system may further comprise a sensor operably coupled to the controller and positionable so as to detect physical characteristics of the agricultural product. The controller may be configured to operate the sensor so as to determine the phase of the circadian rhythm of the agricultural product by measuring delayed fluorescence.

Additionally, in some embodiments, the agricultural product may comprise a first agricultural product and a second agricultural product. Furthermore, the light source may comprise a first light source positionable to emit light that is incident upon the first agricultural product and a second light source positionable to emit light that is incident upon the second agricultural product and not incident upon the first agricultural product. Light emitted by the first set of light sources may not be incident upon the second agricultural product. The controller may be configured to receive as an input a first selected action time associated with the first agricultural product and a second selected action time associated with the second agricultural product. Additionally, the first agricultural product may have an associated circadian rhythm defining a first optimal action time range and the second agricultural product may have an associated circadian rhythm defining a second optimal action time range. Furthermore, the controller may be configured to operate the first set of light sources so as to emit light that imposes a first circadian rhythm on the first agricultural product, thereby shifting the first optimal action time range, such that the first selected action coincides with the first optimal action time range. Additionally, the controller may be configured to operate the second set of light sources so as to emit light that imposes a second circadian rhythm of the second agricultural product, thereby shifting the second optimal action time range, such that the second selected action time coincides with the second optimal action time range. In some embodiments, the first optimal action time range may be associated with a first chemical compound level of the first agricultural product and the second optimal action time range may be associated with a second chemical compound level of the second agricultural product. Furthermore, the first and second chemical compound levels may be selected from the group consisting of bioprotectants, terpenes, and nutraceuticals.

DETAILED DESCRIPTION OF THE INVENTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Those of ordinary skill in the art realize that the following descriptions of the embodiments of the present invention are illustrative and are not intended to be limiting in any way. Other embodiments of the present invention will readily suggest themselves to such skilled persons having the benefit of this disclosure. Like numbers refer to like elements throughout.

Although the following detailed description contains many specifics for the purposes of illustration, anyone of ordinary skill in the art will appreciate that many variations and alterations to the following details are within the scope of the invention. Accordingly, the following embodiments of the invention are set forth without any loss of generality to, and without imposing limitations upon, the claimed invention.

In this detailed description of the present invention, a person skilled in the art should note that directional terms, such as "above," "below," "upper," "lower," and other like terms are used for the convenience of the reader in reference to the drawings. Also, a person skilled in the art should notice this description may contain other terminology to convey position, orientation, and direction without departing from the principles of the present invention.

Furthermore, in this detailed description, a person skilled in the art should note that quantitative qualifying terms such as "generally," "substantially," "mostly," and other terms are used, in general, to mean that the referred to object, characteristic, or quality constitutes a majority of the subject of the reference. The meaning of any of these terms is dependent upon the context within which it is used, and the meaning may be expressly modified.

Throughout the detailed description, reference may be made to an agricultural product, which includes all types of goods as are producible through the cultivation of plants, including goods intended for ingestion, medical use, use in other products, or any other purpose as is known in the art. Furthermore, the term "agricultural products" includes all stages of such products, including those that are in the process of germinating, sprouting, growing, flowering, and post-harvest.

An embodiment of the invention text, as shown and described by the various figures and accompanying text, provides a lighting system that is configured to control biological rhythms of agricultural products through the emission of light having certain characteristics. More specifically, the lighting system may sequentially emit light having varying characteristics so as to entrain agricultural products to a particular biological rhythm, such as a circadian rhythm. Furthermore, the lighting system may be configured to entrain the agricultural products so as to coordinate the biological rhythm of the agricultural product 140, more specifically an optimal action time range associated with the biological rhythm, with a selected action time. Additionally, the lighting system may be configured to emit light that has a biological effect so as to affect a characteristic of the agricultural products.

Figure 1:
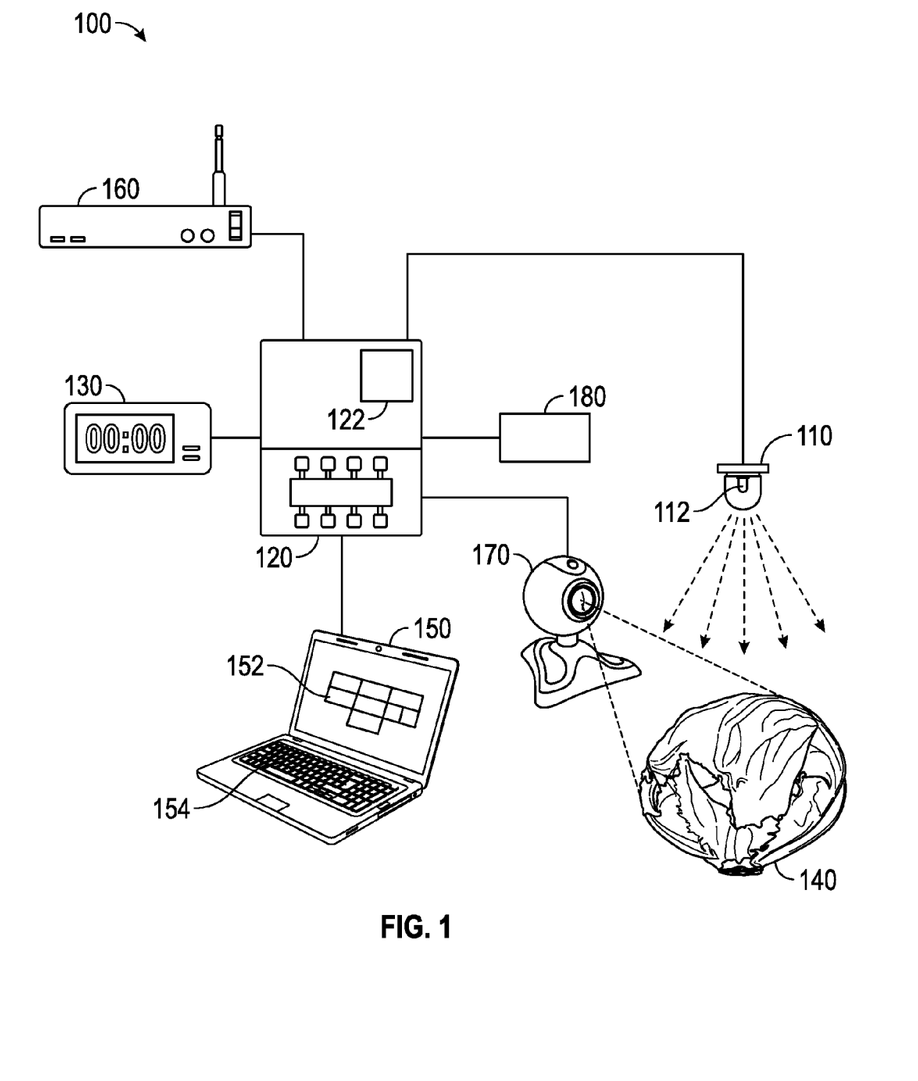
FIG. 1 is an environmental view of a lighting system according to an embodiment of the present invention.

Referring now to FIG. 1, a lighting system 100 according to an embodiment of the present invention is presented. The lighting system 100 may comprise a light source 110, a controller 120, and a timekeeping device 130. The light source 110 may be any type of light-emitting device that is operable to emit light having the characteristics recited hereinbelow. Types of light-emitting devices contemplated by the invention include, but are not limited to, light-emitting semiconductors, such as light-emitting diodes (LEDs), incandescence, halogens, fluorescents (including compact fluorescents), halogens, and high-energy discharge lighting devices. In the present embodiment, the light source 110 comprises an LED die 112. The LED die 112 may comprise a plurality of LEDs. Additionally, in some embodiments, the light source 110 may comprise a plurality of LED dies. Additional information regarding the composition the light source 110 may be found in U.S. Pat. No. 8,686,641 and U.S. patent application Ser. No. 14/315,660, the disclosure of each of which are incorporated by reference hereinabove. Furthermore, in some embodiments, the LED die 112 may comprise one or more color conversion materials configured to alter characteristics of light emitted by the LEDs. Additional information regarding color conversion materials may be found in U.S. Pat. No. 8,408,725 titled Remote Light Wavelength Conversion Device and Associated Methods filed Sep. 16, 2011, the content of which is incorporated by reference herein in its entirety except to the extent disclosure therein is inconsistent with disclosure herein.

The controller 120 may be operably coupled to the light source 110 and configured to control the operation thereof. More specifically, the controller 120 may be configured to control the operation of the light source 110 so as to cause the light source 110 to emit light having certain characteristics. More specifically, the controller 120 may be configured to cause the light source 110 to emit light so as to entrain the circadian rhythm of an agricultural product 140.

Additionally, in some embodiments, the controller 120 may be configured to operate the light source 110 to periodically change the light emitted by the light source 110. The periodicity with which the controller 120 operates the light source 110 may be configured to simulate a circadian rhythm. In some embodiments, the controller 120 may be configured to operate the light source 110 with a 24-hour periodicity. Other periods, including those greater than and less than 24 hours, are contemplated and included within the scope of the invention. For example, the controller 120 may be configured to operate the light source 110 to emit light having certain characteristics in a first configuration, referred to as a day lighting configuration, for a first period of time so as to have a first biological effect, and to emit light having other characteristics in a second configuration, referred to as a night lighting configuration, for a second period of time so as to have a second biological effect. In some embodiments, the first and second biological effects may affect the production of chemical compounds the agricultural product 140. The first and second periods of time may total 24 hours in sum. The day lighting configuration may have similarities to daylight, and the night lighting configuration may have characteristics similar to night typically experience in the night time, such as moonlight. More specifically, the day lighting configuration may have an increased relative spectral intensity of light within a blue wavelength range relative to the spectral intensity within the blue wavelength range in the night lighting configuration. Moreover, the intensity of light in the day lighting configuration may be greater than the intensity of light in the night lighting configuration. Furthermore, other lighting configurations are contemplated, including, but not limited to, configurations that emulate sunrise lighting characteristics, dusk lighting characteristics, and emitting no light.

To maintain periodicity, the controller 120 may be operably coupled to the timekeeping device 130. The timekeeping device 130 may be configured to provide an indication of the passage of time to the controller 120 which the controller 120 may operate the light source 110 responsive to. The timekeeping device 130 may be any type of timekeeping device as is known in the art. Furthermore, in some embodiments, the timekeeping device 130 may be integrated with the controller 120 or any constituent element thereof.

In some embodiments, the optimal action time range may be a range of time when a characteristic of the agricultural product 140 is desirable. Such characteristics may include levels of chemical compounds contained within the agricultural product 140, changes in physical structures of the agricultural product 140, and a variety of secondary characteristics emanating therefrom. The chemical compounds contained within the agricultural product 140 may comprise a primary or secondary metabolite produced by the agricultural product 140. Types of secondary metabolites contemplated by the invention include, but are not limited to, bioprotectants, terpenes, and nutraceuticals. In some embodiments, the optimal action time range may be one of maximizing and minimizing the level of the chemical compound within the agricultural product 140. The length of the optimal action time range may vary by a number of factors, including species or variety of the agricultural product 140, characteristic of the agricultural product 140 that is being optimized, a threshold determination for what is or is not considered to be an optimal range for the characteristic, the extent to which the agricultural product 140 can be entrained to maintain the optimal range of the characteristic, and potential detriments to such entrainment on the agricultural product 140.

In some embodiments, the controller 120 may be configured to receive an input. The input may be received by any means as is known in the art. In some embodiments, the lighting system 100 may further comprise a user interface device 150. The user interface device 150 may be positioned in communication with the controller 120 and configured to provide information to and receive input from a user. In some embodiments, the user interface device 150 may include a display 152 and a user input device 154. In other embodiments, the user interface device 150 may include a touchscreen. Input received by the user interface device 150 may be provided to the controller 120 which may operate the light source 110 responsive thereto.

In some embodiments, the lighting system 100 may comprise a network communication device 160 positioned in communication with the controller 150. The network communication device 160 may be configured to communicate with remote computerized devices across a network, including, but not limited to, a personal area network, a local area network, a wide area network, the Internet, including an Internet area network. Furthermore, the network communication device 160 may be configured to communicate across a network by any means or method known in the art, including wired standards such as Ethernet, Universal Serial Bus (USB), and IEEE 1394, and wireless standards such as Wi-Fi, Bluetooth, Zigbee, cellular data communication, WiMAX, LTE, visible light communication, acoustic communication, and any other wireless communication standard as is known in the art.

The network communication device 160 may be configured to transmit and receive information related to the operation of the lighting system 100 to a remote computerized device. More specifically, the network communication device 160 may be configured to transmit a request for an input from a user related to the operation of the lighting system 100, receive an input from the user responsive to the request, and to send at least one of the input and an indication of the input to the controller 120, which may then operate the light source 110 responsive thereto. In such embodiments, the remote computerized device may include software configured to communicate with the lighting system 100 across a network. The remote computerized device may be any type of device capable of presenting a request for input from a user and receiving input therefrom, including, but not limited to, a personal computer, a smartphone, a tablet computer, and the like.

The controller 120 may be configured to receive an input by any means or method described hereinabove related to a selected action time. The selected action time may indicate the time at which a user desires an action to be performed with relation to the agricultural product 140. The type of action associated with the selected action time may be any type that is related to the agricultural product 140, including, but not limited to, planting, application of fertilizer, application of water, pollination, harvest, consumption, and preparation for consumption. The selected action time may indicate a time of day at which it is desired for the action to take place. In some embodiments, the selected action time may additionally indicate a date as well as the time on which the action is desired to take place The controller 120 may be configured to determine a circadian rhythm for the agricultural product 140 such that the selected used time may coincide with the optimal action time range. The controller 120 may further be configured to determine a lighting schedule that may impose a circadian rhythm on the agricultural product 140 to shift the optimal action time range associated with the present circadian rhythm of the agricultural product 140 so as to coincide with the selected use time. The controller 120 may further be configured to operate the light source 110 responsive to the lighting schedule so as to emit light that imposes a circadian rhythm on the agricultural product 140 such that the optimal action time range of the agricultural product 140 coincides with the selected action time. In some embodiments, the controller 120 may be configured to emit lighting according to the lighting schedule in repetition. Furthermore, the controller 120 may be configured to continue emitting light according to the lighting schedule in repetition until a replacement lighting schedule is determined, or the controller 120 receives an instruction to cease emitting light according to the lighting schedule.

As discussed hereinabove, the lighting schedule may be configured to have a periodicity comporting to a biological rhythm of the agricultural product 140, such as a circadian rhythm. Moreover, the lighting schedule may be configured to mimic various phases of the circadian rhythm of the agricultural product 140. For example, the lighting schedule may include a day period and a night period. The controller 120 may be configured to operate the light source 110 in the day lighting configuration in the day period so as to cause the agricultural product 140 to be in a day phase of its associated circadian rhythm. Furthermore, the controller 120 may be configured to operate the light source 110 in the night lighting configuration in the night period so as to cause the agricultural product 140 to be in a night phase of its associated circadian rhythm. It is contemplated and included within the scope of the invention that any number any type of phases may be included in the circadian rhythm for the agricultural product 140 150, and that a corresponding period in the lighting schedule may similarly be included, as well as an attending lighting configuration.

In some embodiments, the controller 120 may be configured to determine the circadian rhythm for the agricultural product 140, as well as the optimal action time range associated therewith. In some further embodiments, the controller 120 may determine the circadian rhythm for the agricultural product 140 by receiving an input from the user. The input may include an indication as to the species or variety of the plant. In some embodiments, the controller 120 may comprise a memory 122 having stored thereon a database of species or variety of plants for which associated circadian rhythms and optimal action time ranges associated therewith. Responsive to an indication of the species or variety of the plant, the controller 120 may be configured to reference the memory 122 so as to determine a circadian rhythm for the indicated species or variety. The controller 120 may further be configured to operate the light source 110 responsive to the determined circadian rhythm such that the optimal action time range coincides with the selected action time.

In some embodiments, a circadian rhythm associated with the identified species or variety may comprise two or more optimal action time ranges. That is to say, there may be two or more time ranges that present an optimal range for a characteristic of the agricultural product 140 for which the species or variety is indicated. In such embodiments, the input received by the controller 120 may further include an indication as to which characteristic of the agricultural product 140 is sought to be controlled. The controller 120 may be configured to determine the circadian rhythm of the indicated species or variety as well as the optimal action time range associated with the indicated characteristic, and operate the light source 110 responsive to the determined optimal action time range associated with the determined circadian rhythm such that the determined optimal action time range coincides with the selected action time.

Furthermore, in some embodiments, it may be desired for two or more actions to be performed, one subsequent to the other. Additionally, the associated optimal action time ranges for the actions may be the same, or they may be different. For example, the controller 120 may be configured to operate the light source 110 in a first configuration so as to have a first biological effect in the agricultural product 140 and in a second configuration so as to have a second biological effect in the agricultural product 140. Each of the first and second biological effects may be affecting the production of a chemical compound in the agricultural product 140. Additionally, the controller 120 may be configured to receive as an input a first selected action time associated with the first biological effect and a second selected action time associated with the second biological effect. The controller 120 may further be configured to determine first and second optimal action time ranges for each of the first and second biological effects, respectively. The first and second biological effects may be associated with first and second phases of the circadian rhythm of the agricultural product 140, respectively. Moreover, the controller 120 may be configured to determine a lighting schedule such that the first optimal action time range coincides with the first selected action time and the second optimal action time range coincides the with second selected action time. The controller 120 may further be configured to operate the light source 110 responsive to the lighting schedule.

In some embodiments, where the lighting system 100 comprises a network communication device 160, the controller 120 may be configured to access a database of species or variety of plants for which associated circadian rhythms and optimal action time ranges associated therewith stored on a remote memory that is accessible by the controller 120 via the network communication device 160.

In some embodiments, the lighting system 100 may further comprise an image capture device 170. The image capture device 170 may be positioned so as to create an image of the agricultural product 140. Furthermore, the image capture device 170 may be operably connected to the controller 120, and the controller 120 may be configured to operate the image capture device 170 so as to capture an image of the agricultural product 140. Furthermore, in some embodiments, the controller 120 may be configured so as to operate the light source 110 so as to emit an illuminating light configured to facilitate the capturing of an image thereof by the image capture device 170. The illuminating light may have a color rendering index of 90 or greater.

Additionally, the lighting system 100 may further comprise image recognition software. The image recognition software may be configured to identify a species or variety of the agricultural product 140 from the image captured thereof. More specifically, the controller 120 may be configured to perform an agricultural product identification operation by executing the image recognition software and analyzing a captured image of the agricultural product 140. In some embodiments, the image recognition software may be stored on the memory 122 associated with the controller 120. In some embodiments, the image recognition software may be stored on a remote database. Furthermore, in some embodiments, the controller 120 may be configured to capture an image of the agricultural product 140, send the captured image to a remote computerized device for the identification of the species or variety of the agricultural product 140 via the network communication device 160, and receive an indication of the species or variety of the from the remote computerized device via the network communication device 160.

In some embodiments, the lighting system 100 may further comprise a triggering device 170. The triggering device 170 may be operably coupled to the controller 120. Furthermore, the triggering device 170 may be configured to provide an indication to the controller 120 related to a status for which the triggering device 170 is configured to monitor. The triggering device 170 may be configured to indicate one of an active state and a standby state to the controller 120. Furthermore, the controller 120 may be configured to operate the light source 110 responsive to the indication received from the triggering device 170. In some embodiments, the controller 120 may be configured to operate the light source 110 in an observation lighting configuration responsive to an indication of an active state from the triggering device 170. The observation lighting configuration may comprise characteristics of light that facilitates the observation of the agricultural product 140. Furthermore, in some embodiments, the observation lighting configuration may be configured to minimize or avoid affecting the circadian rhythm of the agricultural product 140. Additionally, the controller 120 may be configured to operate the light source 110 in at least one of the day and night lighting configurations responsive to an indication of a standby status from the triggering device 170. The triggering device 170 may be at least one of an occupancy sensor, a motion detector, a device configured to monitor whether a door, window, or other portal is opened or closed, a temperature sensor, a humidity sensor, an acoustic sensor, an optical sensor, a magnetic sensor, and an identification system.

In some embodiments, the lighting system 100 may further be adapted to determine a present phase of the circadian rhythm in the agricultural product 140. For example, the lighting system 100 may comprise a sensor 180 configured to measure a characteristic of the agricultural product 140 so as to determine the present phase of the circadian rhythm thereof. In some embodiments, the sensor 180 may be an optical sensor, and the controller 120 may be configured to operate the light source 110 to emit light that may cause the agricultural product 140 to exhibit delayed fluorescence. The sensor 180 may be configured to measure the delayed fluorescence of the agricultural product 140 and provide an indication of the measured delayed fluorescence to the controller 120. Furthermore, the controller 120 may be configured to determine a present phase of the circadian rhythm of the agricultural product 140. Additionally, the controller 120 may be configured to determine a lighting schedule responsive to the present phase of the circadian rhythm of the agricultural product 140.

Figure 2:
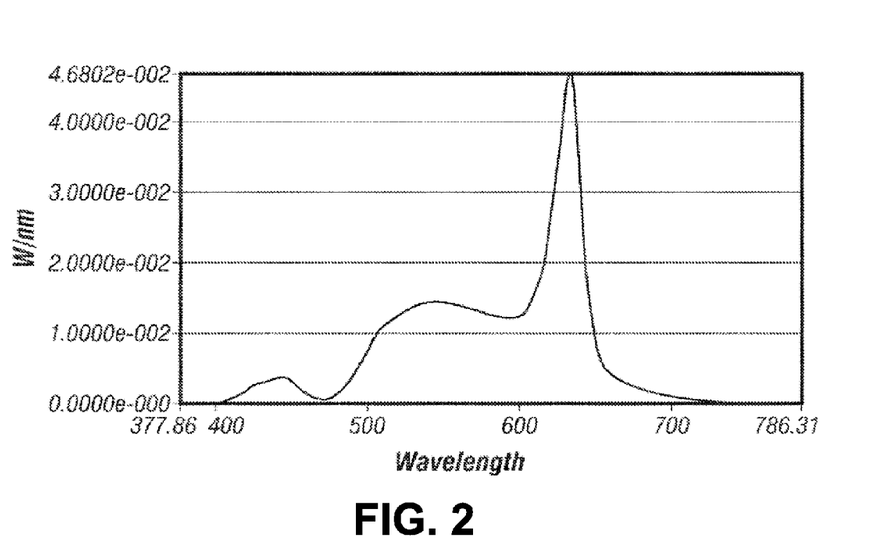
FIG. 2 is a relative spectral power distribution for a day lighting configuration for a lighting system according to an embodiment of the present invention.

FIG. 2 shows a power spectral distribution of a lighting system in a dusk lighting configuration, in accordance with another embodiment presented. The night lighting configuration shown in FIG. 2 may be produced by an array of LED dies in the 3:3:2:1 ratio, driven as follows: (1) three cyan LEDs driven at 7.65V, 66 mA, 0.16679 radiant flux; (2) three mint LEDs driven parallel at 11.13V, 951 mA, 1.8774 radiant flux; (3) two red-orange LEDs driven at 4.375V, 998 mA, 0.96199 radiant flux; and (4) one royal blue LED driven at 2.582V, 30 mA, 0.0038584 radiant flux. The total luminous flux may be 1.024e+003 1 m. The total radiant flux may be 3.0239e+000 W. The dominant wavelength may be 580.3 nm. The general CRI is 87.30. The color temperature may be 2871 K. The 1931 Coordinates (2°) are x: 0.4649, y: 0.4429. The luminous power per radiant watt may be 338 lumens per radiant watt. Other arrays of LEDs operable to emit light having the characteristics recited hereinabove are contemplated and included within the scope of the invention.

Figure 3:
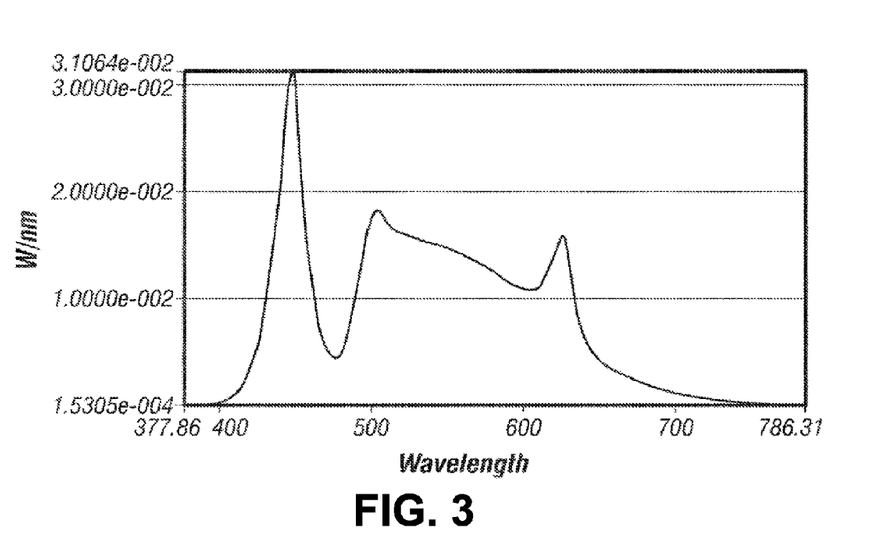
FIG. 3 is a relative spectral power distribution for a dusk lighting configuration for a lighting system according to an embodiment of the present invention.

FIG. 3 shows a power spectral distribution of a lighting system in a day lighting configuration, in accordance with one embodiment presented. The day lighting configuration shown in FIG. 3 may be produced by an array of LED dies in the 3:3:2:1 ratio, driven as follows: (1) three cyan LEDs driven at 8.19V, 235 mA, 0.47233 radiant flux; (2) three mint LEDs driven parallel at 11.14V, 950 mA, 1.9047 radiant flux; (3) two red-orange LEDs driven at 3.745V, 147 mA, 0.1845 radiant flux; and (4) one royal blue LED driven at 2.802V, 525 mA, 0.69093 radiant flux. The total luminous flux may be 9.879e+002 1 m. The total radiant may be is 3.2138e+000 W. The dominant wavelength is 495.6 nm. The peak wavelength may be 449.7 nm. The general CRI is 87.42. The color temperature may be 6,599 K. The 1931 Coordinates (2°) are x: 0.3092, y: 0.3406. The luminous power per radiant watt may be 307 lumens per radiant watt. Other arrays of LEDs operable to emit light having the characteristics recited hereinabove are contemplated and included within the scope of the invention.

Figure 4:
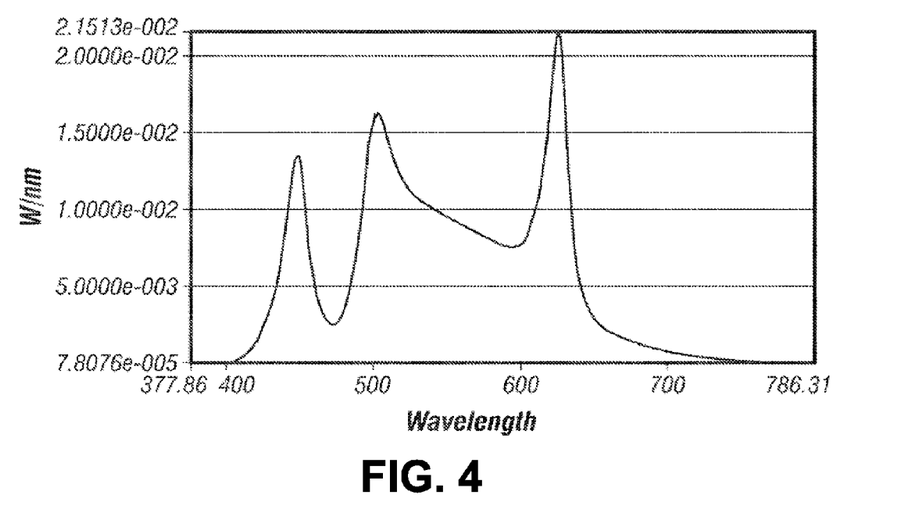
FIG. 4 is a relative spectral power distribution for an observation lighting configuration for a lighting system according to an embodiment of the present invention.

FIG. 4 shows a power spectral distribution of an LED lamp in a observation lighting configuration, in accordance with one embodiment presented. The observation lighting configuration shown in FIG. 4 may be produced by an array of LED dies in the 3:3:2:1 ratio, driven as follows: (1) three cyan LEDs driven at 8.22V, 211 mA, 0.44507 radiant flux; (2) three mint LEDs driven parallel at 10.06V, 499 mA, 1.1499 radiant flux; (3) two red-orange LEDs driven at 3.902V, 254 mA, 0.34343 radiant flux; and (4) one blue LED driven at 2.712V, 190 mA, 0.27280 radiant flux. The total luminous flux may be 7.192e+002 1 m. The total radiant flux may be 2.2248e+000 W. The dominant wavelength may be 566.2 nm. The peak wavelength may be 625.9 nm. The general CRI may be 93.67. The color temperature may be 4897 K. The 1931 Coordinates (2°) are x: 0.3516, y: 0.3874. The luminous power per radiant watt may be 323 lumens per radiant watt. Other arrays of LEDs operable to emit light having the characteristics recited hereinabove are contemplated and included within the scope of the invention.

Figure 5:
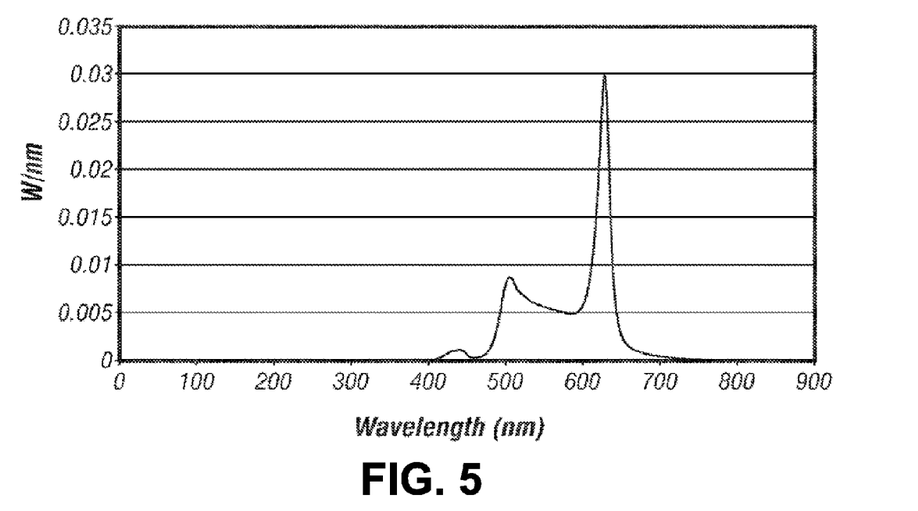
FIG. 5 is a relative spectral power distribution for another day lighting configuration for a lighting system according to an embodiment of the present invention.
Figure 6:
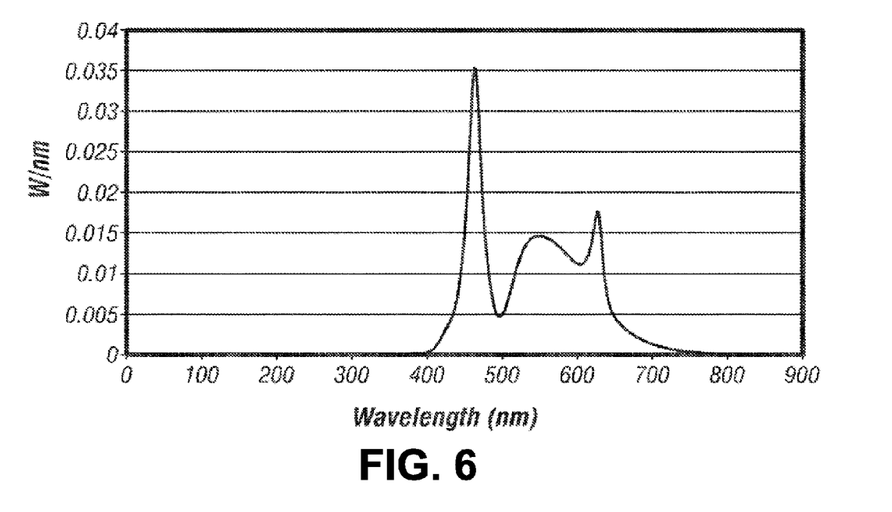
FIG. 6 is a relative spectral power distribution for another dusk lighting configuration for a lighting system according to an embodiment of the present invention.
Figure 7:
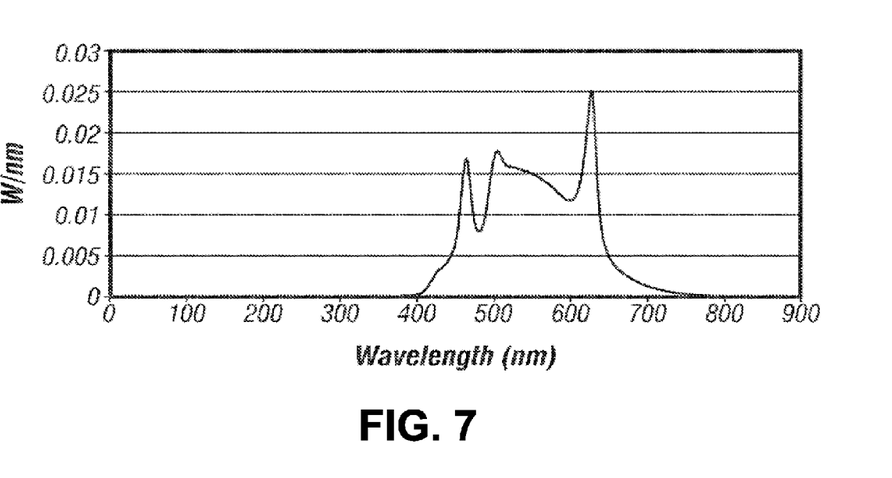
FIG. 7 is a relative spectral power distribution for another observation lighting configuration for a lighting system according to an embodiment of the present invention.

FIGS. 5-7 show the power spectral distributions corresponding respectively to the day, dusk, and observation lighting configurations of the lighting system in accordance with another embodiment of the invention. The lighting system in this embodiment may comprise a light source with a ratio of Cyan, Mint, Red, and Blue dies of 3:3:2:3 respectively. The spectral output of the lamp according to each configuration is adjusted by generating radiant fluxes from multiple dies as described below. Other ratios of LEDs of various colors that may emit light having desired characteristics, including those recited hereinbelow, are contemplated and included within the scope of the invention.

FIG. 5 shows a power spectral distribution of a lighting device in a dusk lighting configuration, in accordance with another embodiment presented. The dusk lighting configuration shown in FIG. 5 may be produced by an array of LED dies in the 3:3:2:3 ratio, driven as follows: (1) three cyan LEDs driven at 7.83V, 91 mA, to generate 0.2048 radiant watts; (2) three mint LEDs driven parallel at 9.42V, 288 mA, 0.6345 radiant watts; (3) two red-orange LEDs driven at 4.077V, 490 mA, 0.5434 radiant watts. The dominant wavelength may be 581.4 nm. The general CRI may be 71. The color temperature may be 2719 K. The luminous power per radiant watt may be 331 lumens per radiant watt. The efficacy may be 91 lumens per watt.

FIG. 6 shows a power spectral distribution of an LED lamp in a day lighting configuration, in accordance with another embodiment presented. The day lighting configuration shown in FIG. 6 may be produced by an array of LED dies in the 3:3:2:3 ratio, driven as follows: (1) three mint LEDs driven parallel at 11.27V, 988 mA, 1.679 radiant watts; (2) two red-orange LEDs driven at 3.78V, 180 mA, 1.971 radiant, and (3) three blue LEDs driven at 9.07V, 296 mA, 0.8719 radiant watts. The dominant wavelength may be 476.9 nm. The general CRI may be 88. The color temperature may be 6235 K. The luminous power per radiant watt may be 298 lumens per radiant watt. The efficacy may be 63 lumens per watt.

FIG. 7 shows a power spectral distribution of an LED lamp in an observation lighting configuration, in accordance with another embodiment presented. The observation lighting configuration shown in FIG. 19 may be produced by an array of LED dies in the 3:3:2:3 ratio, driven as follows: (1) three cyan LEDs driven at 8.16V, 218 mA, to generate 0.4332 radiant watts; (2) three mint LEDs driven parallel at 11.23V, 972 mA, 1.869 radiant watts; (3) two red-orange LEDs driven at 3.89V, 295 mA, 0.3520 radiant watts. The dominant wavelength may be 565.6 nm. The general CRI may be 90. The color temperature may be 4828 K. The luminous power per radiant watt may be 335 lumens per radiant watt. The efficacy may be 68 lumens per watt In an alternative embodiment, in the day lighting configuration, the intensity levels of blue component in the 455 nm to 485 nm range may be greater than about 125% of the relative spectral power of any other peaks in the visible light spectrum higher than 485 nm. In alternative embodiments, the blue component in the 455 nm to 485 nm range may be greater than about 150%; or about 175%; or about 200%; or about 250%; or about 300% of the relative spectral power of any other peaks in the visible light spectrum higher than 485 nm. The color rendering index may be greater than 80. By varying the radiant fluxes of one or more of the dies, for example by varying the current drawn by the dies, the intensity of the blue component relative to other spectral peaks greater than 485 nm may be adjusted to the desired level.

In an alternative embodiment, in the night lighting configuration, the controller may be configured to operate the plurality of LED dies such that a blue output intensity level, in a visible spectral output range of between about 380 nm and about 485 nm, is less than about 10% of a relative spectral power of any other peaks in the visible spectral output above about 485 nm. For example, the controller may drive the plurality of LED dies such that about 150 mA of current is delivered to the mint LED dies; about 360 mA of current is delivered to the red LED dies; and about 40 mA of current is delivered to the cyan LED dies.

In an alternative embodiment, in the observation lighting configuration, the intensity levels of blue component in the 380 nm to 485 nm range is preferably about 100% of the relative spectral power of any other peaks in the visible light spectrum higher than 485 nm. In alternative embodiments, the intensity levels of blue component in the 380 nm to 485 nm range is preferably less than about 100%; or less than about 90%; or less than about 80%; or between about 20% to about 100% of the relative spectral power of any other peaks in the visible light spectrum higher than 485 nm. The color rendering index may be greater than 85.

Figure 8:
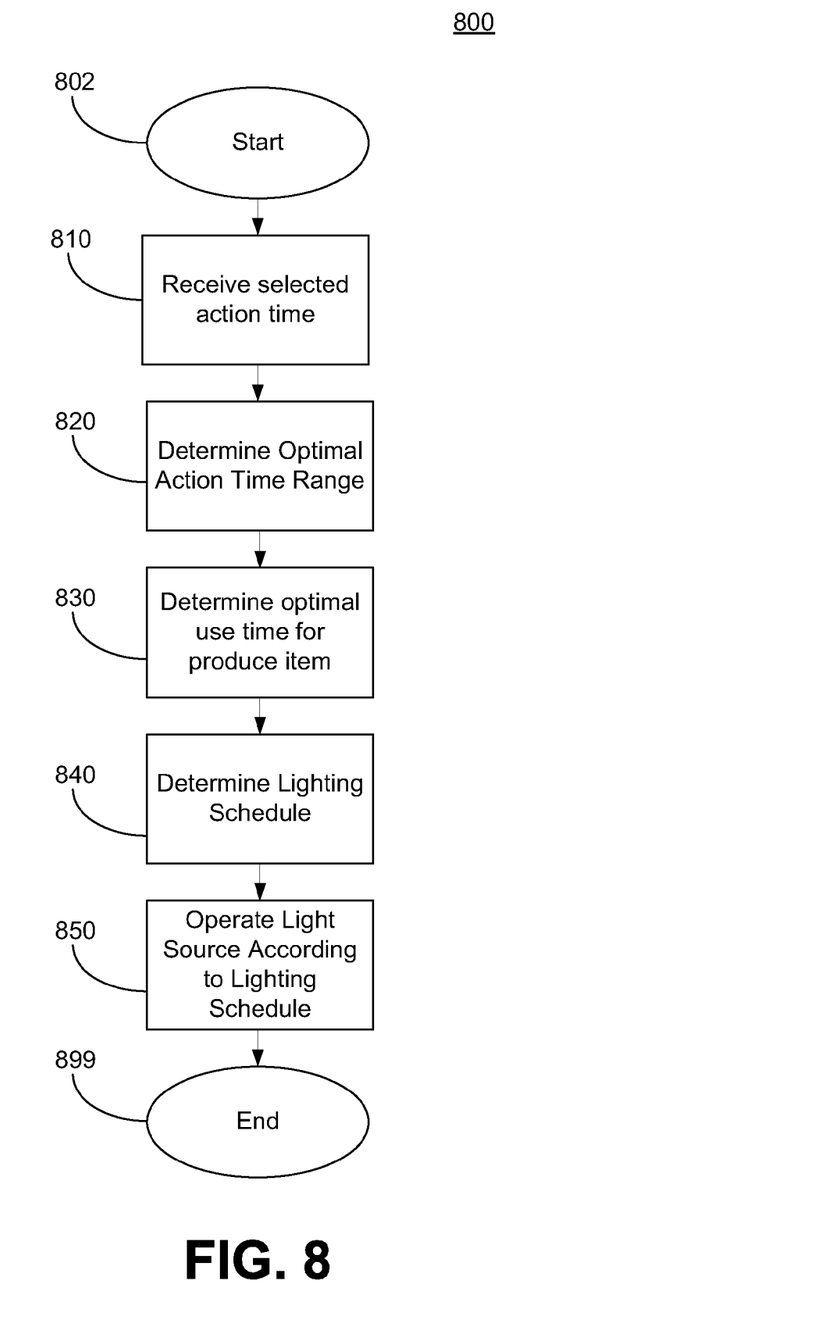
FIG. 8 is a flowchart illustrating a method of controlling a circadian rhythm of an agricultural product according to an embodiment of the present invention.

Referring now to FIG. 8, a flowchart illustrating a method 800 of controlling a circadian rhythm of an agricultural product is presented. The method 800 may be performed by a lighting system as described in various embodiments disclosed hereinabove. Reference to various elements of a lighting system in the method 800 may be performed by analogous elements included in the disclosure hereinabove. Beginning at Block 802, a controller may receive a selected action time for an agricultural product at Block 810. At Block 820, an optimal action time range associated with the agricultural product 140 may be determined by the controller.

Continuing at Block 830, an optimal action time range within which the selected action is preferably performed may be determined for the agricultural product 140. At Block 840, a lighting schedule responsive to at least the selected action time and the optimal action time range may be determined so as to impose a circadian rhythm on the agricultural product 140. The lighting schedule may comprise emitting light in a first lighting configuration, such as the day lighting configuration, for a first period of time, and emitting light in a second lighting configuration, such as the night lighting configuration, for a second period of time. Furthermore, the controller may be configured to operate the light source responsive to the lighting schedule in repetition until a replacement lighting schedule is determined or any other indication for the controller to cease emitting light according to the lighting schedule. In some embodiments, the determination of a lighting schedule may comprise determining a present time as indicated by a timekeeping device and determining the lighting scheduled further responsive to the present time. At Block 850, the controller may operate a light source so as to emit light according to the lighting schedule. The method 800 may end at Block 899.

Figure 9:
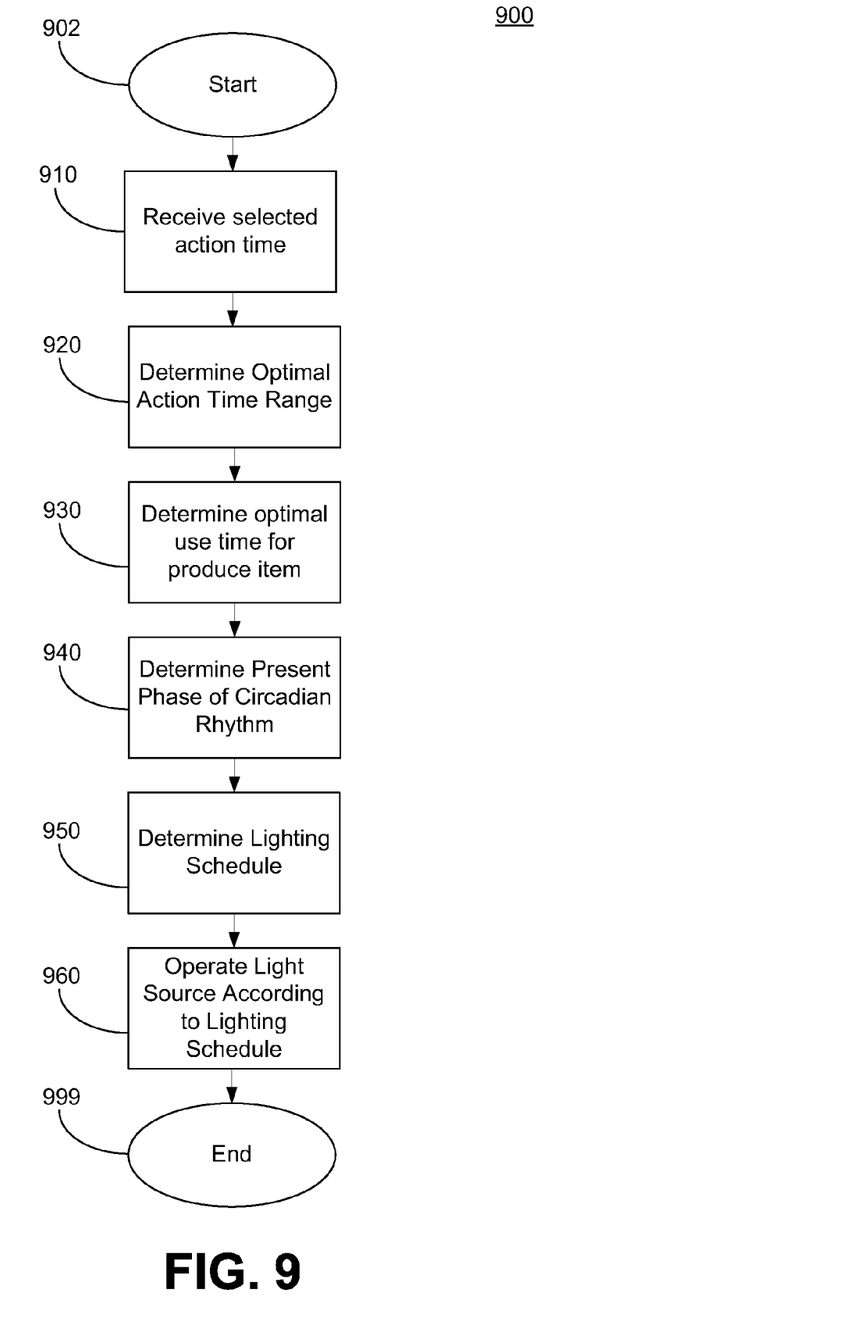
FIG. 9 is a flowchart illustrating another method of controlling a circadian rhythm of an agricultural product according to an embodiment of the present invention.

Referring now to FIG. 9, a flowchart illustrating a method 900 of controlling a circadian rhythm of an agricultural product is presented. The method 900 may be performed by a lighting system as described in various embodiments disclosed hereinabove. Reference to various elements of a lighting system in the method 900 may be performed by analogous elements included in the disclosure hereinabove. Beginning at Block 902, a controller may receive a selected action time for an agricultural product at Block 910. At Block 920, an optimal action time range associated with the agricultural product 140 may be determined by the controller.

Continuing at Block 930, an optimal action time range within which the selected action is preferably performed may be determined for the agricultural product 140. At Block 940, the present phase of the circadian rhythm of the agricultural product 140 may be determined. Then, at Block 950, a lighting schedule responsive to at least the selected action time, the optimal action time range, and the present phase of the circadian rhythm of the agricultural product 140 may be determined so as to impose a circadian rhythm on the agricultural product 140. The lighting schedule may comprise emitting light in a first lighting configuration, such as the day lighting configuration, for a first period of time, and emitting light in a second lighting configuration, such as the night lighting configuration, for a second period of time. Furthermore, the controller may be configured to operate the light source responsive to the lighting schedule in repetition until a replacement lighting schedule is determined or any other indication for the controller to cease emitting light according to the lighting schedule. In some embodiments, the determination of a lighting schedule may comprise determining a present time as indicated by a timekeeping device and determining the lighting scheduled further responsive to the present time. At Block 960, the controller may operate a light source so as to emit light according to the lighting schedule. The method 900 may end at Block 999.

Figure 10:
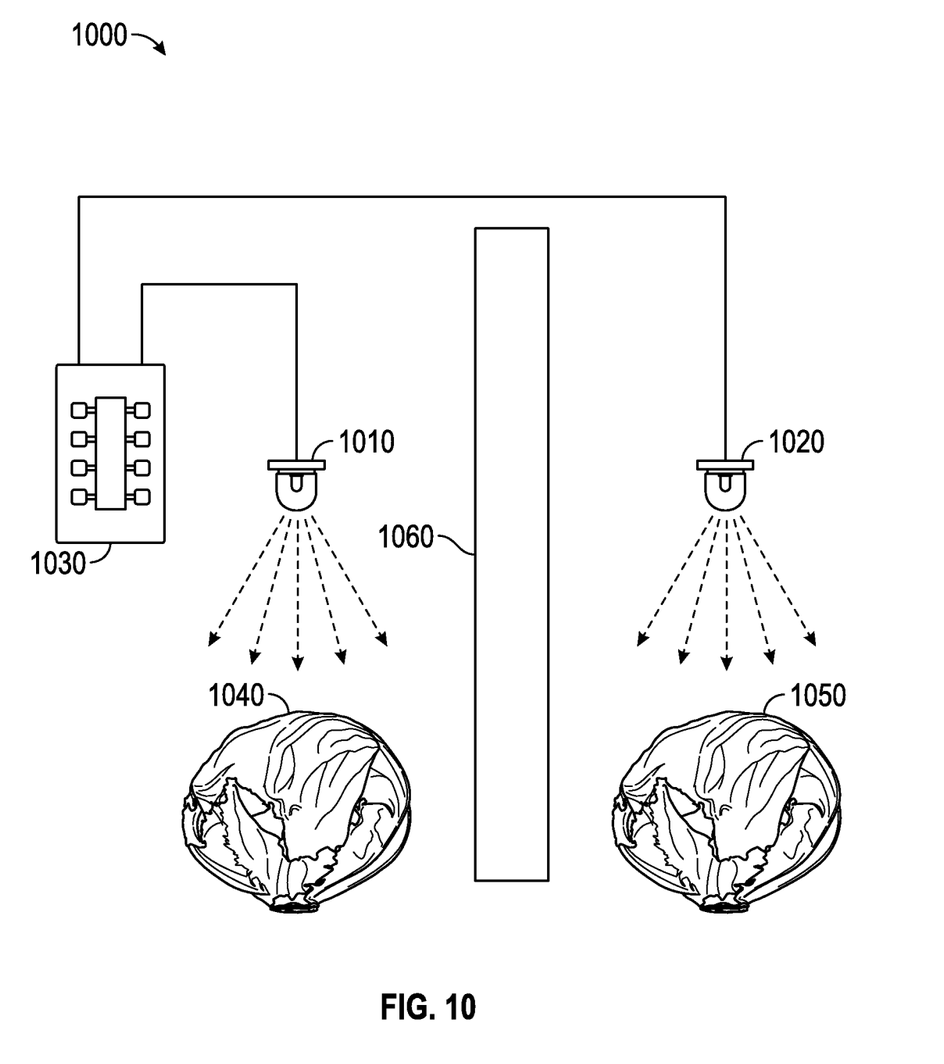
FIG. 10 is a schematic environmental view of a lighting system according to an embodiment of the present invention.

Referring now to FIG. 10, a lighting system 1000 according to another of the invention is presented. The lighting system 1000 may comprise a first light source 1010, a second light source 1020, and a controller 1030 operably coupled to each of the first and second light sources 1010, 1020. The controller 1030 may be configured to operate each of the first and second light sources 1010, 1020 as the controller 120 is configured to operate the light source 110 described hereinabove for the embodiment of FIG. 1. Moreover, the controller 1030 may be configured to operate each of the first and second light sources 1010, 1020 independently of one another.

The first light source 1010 may be positioned and configured to emit light that is incident upon a first agricultural product 1040, and the second light source 1020 may be positioned and configured to emit light that is incident upon a second agricultural product 1050. In some embodiments, light emitted by the first light source 1010 may be incident upon only the first agricultural product 1040 and not upon the second agricultural product 1050, and light emitted by the second light source 1020 may be incident upon only the second agricultural product 1050 and not upon the first agricultural product 1040. In some embodiments, a partition 1060 may be positioned so as to prevent light emitted by the first light source 1010 from being incident upon the second agricultural product 1050 and/or to prevent light emitted by the second light source 1020 from being incident upon the first agricultural product 1040. In other embodiments, light emitted by the first light source 1010 may be incident upon each of the first and second agricultural products 1040, 1050, and light emitted by the second light source 1020 may also be incident upon each of the first and second agricultural products 1040, 1050. The first and second agricultural products 1040, 1050, may be of the same species or variety, or they may be of different species or variety.

The controller 1030 may be configured to operate the first light source 1010 so as to impose a first circadian rhythm on the first agricultural product 1040 and the second light source 1020 so as to impose a second circadian rhythm upon the second agricultural product 1050. Furthermore, the controller 1030 may be configured to receive as an input a first selected action time associated with the first agricultural product 1040 and a second selected action time associated with the second agricultural product 1050. Furthermore, the controller 1030 may be configured to determine first and second optimal action time ranges associated with each of the first and second agricultural products 1040, 1050, respectively, as described hereinabove in previous embodiments. Furthermore, the controller 1030 may be configured to determine first and second lighting schedules for the respective first and second agricultural products 1040, 1050. The controller 1030 may further be configured to operate each of the first and second light sources 1010, 1020 according to the first and second lighting schedules, respectively. The first and second lighting schedules may be different, or they may be the same.

In some embodiments, the controller 1030 may be configured to determine different characteristics within each of the first and second agricultural products 1040, 1050 for which the first and second optimal action time ranges are determined. More specifically, the controller 1030 may be configured to determine the first optimal action time range for a first characteristic in the first agricultural product 1040 and the second optimal action time range for a second characteristic in the second agricultural product 1050. The first and second characteristics by the same, or they may be different. In some embodiments, the first characteristic may be a first chemical compound level in the first agricultural product 1040 and the second characteristic may be a second chemical compound level in the second agricultural product 1050.

While the present embodiment depicts a lighting system capable of entraining two agricultural products, lighting systems capable of entraining any number of agricultural products are contemplated and included within the scope of the invention.

Some of the illustrative aspects of the present invention may be advantageous in solving the problems herein described and other problems not discussed which are discoverable by a skilled artisan.

While the above description contains much specificity, these should not be construed as limitations on the scope of any embodiment, but as exemplifications of the presented embodiments thereof. Many other ramifications and variations are possible within the teachings of the various embodiments. While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

Thus the scope of the invention should be determined by the appended claims and their legal equivalents, and not by the examples given.

That which is claimed is:

1. A lighting system comprising:
   a light source;
   a controller operably coupled to the light source; and
   a timekeeping device operably coupled to the controller;
   wherein the controller is configured to receive a selected action time associated with an agricultural product;
   wherein the agricultural product includes an associated circadian rhythm defining an optimal action time range;
   wherein the controller is configured to determine a lighting schedule responsive to the selected action time, the optimal action time range, and a time of day indicated by the timekeeping device, the lighting schedule being configured to impose a circadian rhythm on the agricultural product to shift the optimal action time range such that the selected action time coincides with the optimal action time range;
   wherein the controller is configured to operate the light source according to the lighting schedule; and
   wherein the controller is configured to determine a phase of the circadian rhythm of the agricultural product; wherein the controller is configured to determine a shifting schedule configured to shift the circadian rhythm of the agricultural product from the determined phase such that the optimal action time range corresponds with the selected action time.

2. The lighting system according to claim 1 wherein the lighting schedule comprises a day period and a night period; wherein the controller is configured to operate the light source in a day lighting configuration to emit light that causes the agricultural product to be in a day phase of the associated circadian rhythm in the day period; and wherein the controller is configured to operate the light source in a night lighting configuration to emit light that causes the agricultural product to be in a night phase of the associated circadian rhythm in the night period.

3. The lighting system according to claim 2 wherein the controller is configured to operate the light source to emit light such that an output intensity level within the range from 380 nm to 480 nm is greater than 125% of a relative spectral power of any other peaks above 455 nm in the day configuration.

4. The lighting system according to claim 2 wherein the controller is configured to operate the light source such that an output intensity level within the range from 380 nm to 480 nm is less than 10% of a relative spectral power of any other peaks above 485 nm in the night configuration.

5. The lighting system according to claim 2 further comprising a triggering device operably coupled to the controller and configured to indicate one of an active state and a standby state; wherein the controller is further configured to operate the light source in an observation configuration to emit light that facilitates the observation of the agricultural product without affecting the circadian rhythm of the agricultural product responsive to the state indicated by the triggering device; wherein an indication of the standby state causes the controller to operate the light source in one of the day lighting configuration and the night lighting configuration; and wherein an indication of the active state causes the controller to operate the light source in the observation configuration.

6. The lighting system according to claim 5 wherein the controller is configured to operate the light source such that an output intensity level within the range from 380 nm to 480 nm is within the range from 20% to 100% of a relative spectral power of any other peaks above 485 nm in the observation configuration.

7. The lighting system according to claim 1 wherein the optimal action time range is associated with a chemical compound level of the agricultural product.

8. The lighting system according to claim 7 wherein the chemical compound is selected from the group of secondary metabolites consisting of bioprotectants, terpenes, and nutraceuticals.

9. The lighting system according to claim 1 wherein the lighting scheduled is configured to at least one of maximize a chemical compound level of the agricultural product at the selected action time and minimize a chemical compound level of the agricultural product at the selected action time.

10. The lighting system according to claim 1 wherein the controller is configured to determine the circadian rhythm for the agricultural product.

11. The lighting system according to claim 10 wherein the circadian rhythm for the agricultural product is determined by receiving as an input an indication of the species of the agricultural product.

12. The lighting system according to claim 10 further comprising:
    an image capture device operably connected to the controller; and
    image recognition software configured to visually identify a species of the agricultural product;
    wherein the controller is configured to operate the image capture device to capture an image of the agricultural product; and wherein the controller is configured to perform an agricultural product identification operation by using the image recognition software.

13. A lighting system comprising:
a light source; and
a controller operably coupled to the light source;
a sensor operably coupled to the controller and positionable so as to detect physical characteristics of the agricultural product;
wherein the controller is configured to receive as an input a selected action time associated with an agricultural product;
wherein the agricultural product has an associated circadian rhythm defining an optimal action time range;
wherein the controller is configured to determine a lighting schedule responsive to the selected action time and the optimal action time range, the lighting schedule being configured to impose a circadian rhythm on the agricultural product to shift the optimal action time range such that the selected action time coincides with the optimal action time range;
wherein the controller is configured to operate the sensor so as to determine a phase of the circadian rhythm of the agricultural product by measuring delayed fluorescence; and
wherein the controller is configured to operate the light source according to the lighting schedule and the phase of the circadian rhythm of the agricultural product.

14. The lighting system according to claim 13 wherein the optimal action time range is associated with a chemical compound level of the agricultural product.

15. The lighting system according to claim 14 wherein the chemical compound is selected from the group of secondary metabolites consisting of bioprotectants, terpenes, and nutraceuticals.

16. The lighting system according to claim 13 wherein:
the agricultural product comprises a first agricultural product and a second agricultural product;
the light source comprises a first light source positionable to emit light that is incident upon the first agricultural product and a second light source positionable to emit light that is incident upon the second agricultural product and not incident upon the first agricultural product;
light emitted by the first set of light sources is not incident upon the second agricultural product;
the controller is configured to receive as an input a first selected action time associated with the first agricultural product and a second selected action time associated with the second agricultural product;
the first agricultural product has an associated circadian rhythm defining a first optimal action time range and the second agricultural product has an associated circadian rhythm defining a second optimal action time range;
the controller is configured to operate the first light source so as to emit light that imposes a first circadian rhythm on the first agricultural product, thereby shifting the first optimal action time range, such that the first selected action coincides with the first optimal action time range; and
the controller is configured to operate the second light source so as to emit light that imposes a second circadian rhythm of the second agricultural product, thereby shifting the second optimal action time range, such that the second selected action time coincides with the second optimal action time range.

17. The lighting system according to claim 16 wherein the first optimal action time range is associated with a first chemical compound level of the first agricultural product and the second optimal action time range is associated with a second chemical compound level of the second agricultural product.

18. The lighting system according to claim 17 wherein the first and second chemical compound levels are selected from the group consisting of bioprotectants, terpenes, and nutraceuticals.

19. A lighting system comprising:
a controller;
a light source operably coupled to the controller; and
a timekeeping device operably coupled to the controller;
wherein the controller is configured to operate the light source so as to emit light in one of a first configuration and a second configuration;
wherein the controller is configured to operate the light source to emit light so as to have a first biological effect in an agricultural product in the first configuration;
wherein the controller is configured to operate the light source to emit light so as to have a second biological effect in the agricultural product in the second configuration;
wherein the controller is configured to determine a lighting schedule responsive to a time of day indicated by the timekeeping device, the lighting schedule comprising emitting light in the first configuration for a first period of time associated with a first phase of a circadian rhythm of the plant and emitting light in the second configuration for a second period of time associated with a second phase of the circadian rhythm of the agricultural product;
wherein the controller is configured to operate the light source responsive to the lighting schedule; and
wherein the first biological effect affects production of a first chemical compound;
and wherein the second biological effect affects production of a second chemical compound.

20. The lighting system according to claim 19 wherein each of the first and second chemical compounds are selected from the group consisting of bioprotectants, terpenes, and nutraceuticals.

21. The lighting system according to claim 19 wherein the lighting schedule further comprises emitting no light for a third period of time.

* * * * *